United States Patent
Chandramouli et al.

(10) Patent No.: US 10,628,152 B2
(45) Date of Patent: Apr. 21, 2020

(54) AUTOMATIC GENERATION OF MICROSERVICES BASED ON TECHNICAL DESCRIPTION OF LEGACY CODE

(71) Applicant: Accenture Global Solutions Limited, Dublin (IE)

(72) Inventors: M. Chandramouli, Chennai (IN); Vidyasagar Honnappa, Bangalore (IN); Nitin Madhukar Sawant, Mumbai (IN); Pramod Bijani, Bandra (West) Mumbai (IN); Ravichandran Subramaniam, Bangalore (IN); Satya Bharat, Ongole (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/626,830

(22) Filed: Jun. 19, 2017

(65) Prior Publication Data
US 2018/0365008 A1    Dec. 20, 2018

(51) Int. Cl.
*G06F 8/76* (2018.01)
*G06F 8/65* (2018.01)

(52) U.S. Cl.
CPC . *G06F 8/76* (2013.01); *G06F 8/65* (2013.01)

(58) Field of Classification Search
CPC . G06F 8/76; G06F 8/65–77; G06F 17/20–289
See application file for complete search history.

(56) References Cited

U.S. PATENT DOCUMENTS

| | | | |
|---|---|---|---|
| 6,389,588 B1 | 5/2002 | Wadhwa et al. | |
| 8,918,311 B1* | 12/2014 | Johnson | G06F 17/271 704/9 |
| 9,456,170 B1* | 9/2016 | Miller | G06K 9/72 |
| 9,460,075 B2* | 10/2016 | Mungi | G06F 17/271 |
| 9,772,837 B2* | 9/2017 | Kalidindi | G06F 8/65 |
| 9,842,045 B2* | 12/2017 | Heorhiadi | G06F 11/3692 |
| 9,875,098 B2* | 1/2018 | Mehalingam | G06F 8/74 |
| 2004/0205708 A1* | 10/2004 | Kothari | G06F 8/30 717/113 |

(Continued)

OTHER PUBLICATIONS

Dullmann et al., Model-driven Generation of Microservice Architectures for Benchmarking Performance and Resilience Engineering Approaches, published by ACM, pp. 171-172, retrieved online [https://dl.acm.org/citation.cfm?id=3053627] (Year: 2017).*

(Continued)

*Primary Examiner* — Thuy Dao
*Assistant Examiner* — Zheng Wei
(74) *Attorney, Agent, or Firm* — Harrity & Harrity, LLP (57) ABSTRACT

A device may receive information that identifies code associated with an application. The device may generate a technical description of the code based on the information that identifies the code associated with the application. The device may generate a set of rules based on the technical description of the code. The set of rules being associated with a semantics of business vocabulary and business rules (SBVR) format. The device may generate a set of microservices based on the set of rules. The device may provide information that identifies the set of microservices to cause an action to be performed.

20 Claims, 6 Drawing Sheets

(56) References Cited

U.S. PATENT DOCUMENTS

| | | | |
|---|---|---|---|
| 2005/0273315 A1 | 12/2005 | Laitila | |
| 2006/0025987 A1 | 2/2006 | Baisley et al. | |
| 2007/0106520 A1* | 5/2007 | Akkiraju | G06Q 10/06 717/105 |
| 2007/0112574 A1* | 5/2007 | Greene | G06F 9/5072 340/572.1 |
| 2007/0240109 A1 | 10/2007 | Chandra et al. | |
| 2007/0245320 A1 | 10/2007 | Cotchini et al. | |
| 2010/0138815 A1* | 6/2010 | Schneider | G06F 8/41 717/141 |
| 2010/0325606 A1 | 12/2010 | Sundararajan et al. | |
| 2011/0167414 A1* | 7/2011 | Lattner | G06F 8/70 717/140 |
| 2011/0276954 A1* | 11/2011 | Fontenot | G06F 8/47 717/151 |
| 2013/0031531 A1* | 1/2013 | Keynes | G06F 8/74 717/126 |
| 2015/0142718 A1 | 5/2015 | Bostick et al. | |
| 2015/0268955 A1 | 9/2015 | Mehalingam et al. | |
| 2015/0347128 A1* | 12/2015 | Frenkiel | G06F 8/73 717/123 |
| 2016/0124742 A1* | 5/2016 | Rangasamy | H04L 47/70 717/103 |
| 2016/0299884 A1* | 10/2016 | Chioasca | G06F 17/2705 |
| 2016/0378453 A1* | 12/2016 | Kalidindi | G06F 8/65 717/173 |
| 2017/0061445 A1* | 3/2017 | Sunkle | G06Q 30/018 |
| 2017/0168784 A1* | 6/2017 | Hwang | G06F 8/34 |
| 2017/0187785 A1* | 6/2017 | Johnson | H04L 67/10 |
| 2017/0192758 A1* | 7/2017 | Apte | G06F 8/427 |
| 2017/0192777 A1* | 7/2017 | Apte | G06F 8/427 |
| 2017/0236129 A1* | 8/2017 | Kholkar | G06Q 30/018 705/317 |
| 2017/0242784 A1* | 8/2017 | Heorhiadi | G06F 11/3692 |
| 2017/0364434 A1* | 12/2017 | Kairali | G06F 11/3668 |
| 2018/0004544 A1* | 1/2018 | Vasiltschenko | H04L 67/26 |
| 2018/0018302 A1* | 1/2018 | Vasiltschenko | G06F 17/212 |
| 2018/0039570 A1* | 2/2018 | Rajagopalan | G06F 11/3636 |
| 2018/0075335 A1* | 3/2018 | Braz | G06F 16/24522 |
| 2018/0108125 A1* | 4/2018 | Beymer | G06K 9/00442 |
| 2018/0146070 A1* | 5/2018 | Lopushenko | G06F 9/454 |
| 2018/0232443 A1* | 8/2018 | Delgo | G06F 17/278 |
| 2018/0341630 A1* | 11/2018 | DeVries | G06F 17/2755 |

OTHER PUBLICATIONS

Bajwa et al., SBVR Business Rules Generation from Natural Language Specification. Published by Association of the Advancement of Artificial Intelligence. pp. 2-8, retrieved online [https://www.aaai.org/ocs/index.php/SSS/SSS11/paper/viewFile/2378/2918] (Year: 2010).*

Carreras et al., TAG, Dynamic Programming, and the Perceptron for Efficient, Feature-rich Parsing, published by CoNLL 2008: Proceedings of the 12th Conference on Computational Natural Language Learning, pp. 9-16, Manchester, Aug. 2008 (Year: 2008).*

Kenji Sagae, Analysis of Discourse Structure with Syntactic Dependencies and Data-Driven Shift-Reduce Parsing, published by Proceedings of the 11th International Conference on Parsing Technologies (IWPT), pp. 81-84, Paris, Oct. 2009 (Year: 2009).*

Sam Newman, "Building Microservices", published by O'Reilly, Preview Edition, pp. 1-92 (Year: 2015).*

Wizenty et al., "MAGMA: Build Management-based Generation of Microservice Infrastructures", published by ECSA '17, Sep. 11-15, 2017, Canterbury, United Kingdom, pp. 1-5 (Year: 2017).*

Pérez-Castillo R et al., 'Knowledge Discovery Metamodel-ISO/IEC 19506: A standard to modernize legacy systems' Computer Standards & Interfaces 33 (2011) 519-532.

Nadareishvili I. et al, 'Microservice Architecture Aligning Principles, Practices, and Culture' O'Reilly Media, Inc., Sebastopol, CA, Jun. 2016 ,ISBN: 978-1491956250.

Karpovic J. et al., "Transforming SBVR business semantics into Web ontology language OWL2: main concepts." Information Technologies (2011): 27-29.

Levcovitz A., et al., "Towards a Technique for Extracting Microservices from Monolithic Enterprise Systems," 3rd Brazilian Workshop on Software Visualization, Evolution and Maintenance (VEM), 2015, https://arxiv.org/pdf/1605.03175.pdf, pp. 97-104.

* cited by examiner

AUTOMATIC GENERATION OF MICROSERVICES BASED ON TECHNICAL DESCRIPTION OF LEGACY CODE

BACKGROUND

Legacy or application modernization, refers to the conversion, rewriting, or porting of a legacy system to a modern computer programming language, software libraries, protocols, or hardware platform. Legacy transformation aims to retain and extend the value of the legacy investment through migration to new platforms.

SUMMARY

According to some possible implementations, a device may include one or more processors to receive information that identifies code associated with an application. The one or more processors may generate a technical description of the code based on the information that identifies the code associated with the application. The one or more processors may generate a set of rules based on the technical description of the code. The set of rules may be associated with a semantics of business vocabulary and business rules (SBVR) format. The one or more processors may generate a set of microservices based on the set of rules. The one or more processors may provide information that identifies the set of microservices to cause an action to be performed.

According to some possible implementations, a method may include receiving, by a device, information that identifies code associated with an application. The method may include generating, by the device, a technical description of the code based on the information that identifies the code associated with the application. The method may include generating, by the device, a set of rules based on the technical description of the code. The method may include generating, by the device, a set of microservices based on the set of rules. The method may include providing, by the device, information that identifies the set of microservices to permit an action to be performed.

According to some possible implementations, a non-transitory computer-readable medium may store one or more instructions that, when executed by one or more processors, cause the one or more processors to receive information that identifies code associated with an application. The one or more instructions may cause the one or more processors to generate a technical description of the code based on the information that identifies the code associated with the application. The one or more instructions may cause the one or more processors to generate a set of rules based on the technical description of the code. The set of rules may be associated with a semantics of business vocabulary and business rules (SBVR) format. The one or more instructions may cause the one or more processors to generate a set of microservices based on the set of rules. The one or more instructions may cause the one or more processors to provide information that identifies the set of microservices to permit an action to be performed.

DETAILED DESCRIPTION

The following detailed description of example implementations refers to the accompanying drawings. The same reference numbers in different drawings may identify the same or similar elements.

Legacy applications are commonly monolithic (e.g., with most or all functions being combined in a single program). For this reason, modification, extensibility, etc., of a legacy application may be limited. Furthermore, legacy applications are often written in outdated programming languages (e.g., the COBOL, Assesmber, PL/I programming language) and may have limited compatibility with other applications. Efforts to modernize legacy applications have been error prone, time consuming, subjective, and/or the like.

Some implementations described herein provide the automatic generation of microservices based on technical descriptions of code associated with a monolithic application. For example, some implementations described herein provide a generation platform to receive information associated with code of an application, generate a technical description of the code, and generate a set of business rules based on the technical description of the code. Additionally, some implementations described herein provide the generation platform to generate a set of microservices based on the set of business rules and a set of code templates. In this way, some implementations described herein improve modularity of monolithic applications, reduce an amount of manual programming, reduce errors associated with manual generation of microservices, conserve computing resources of computing devices associated with modernizing legacy applications by reducing an amount of manual programming, or the like.

Figure 1A:
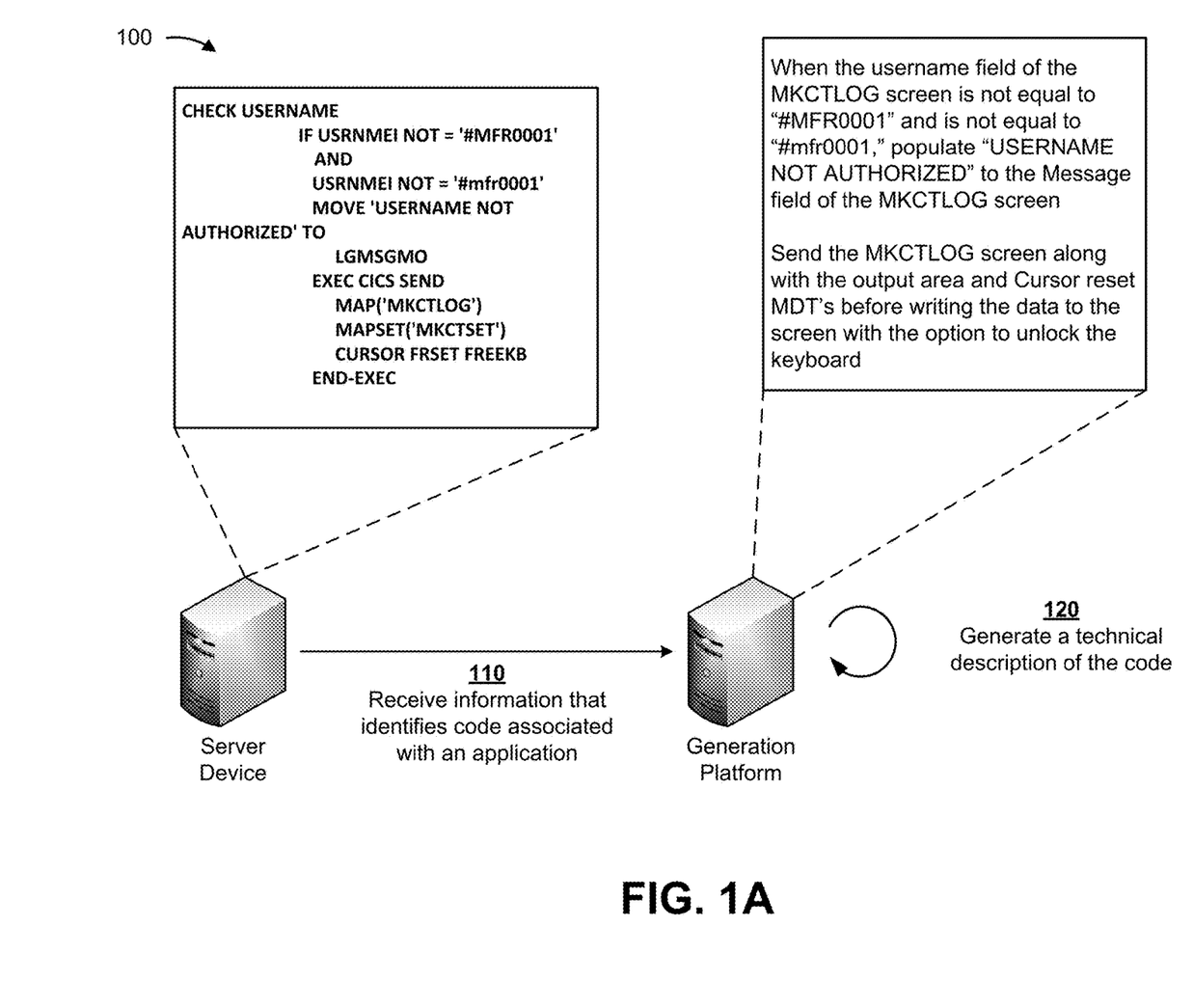
FIGS. 1A-1C are diagrams of an overview of an example implementation described herein.
Figure 1B:
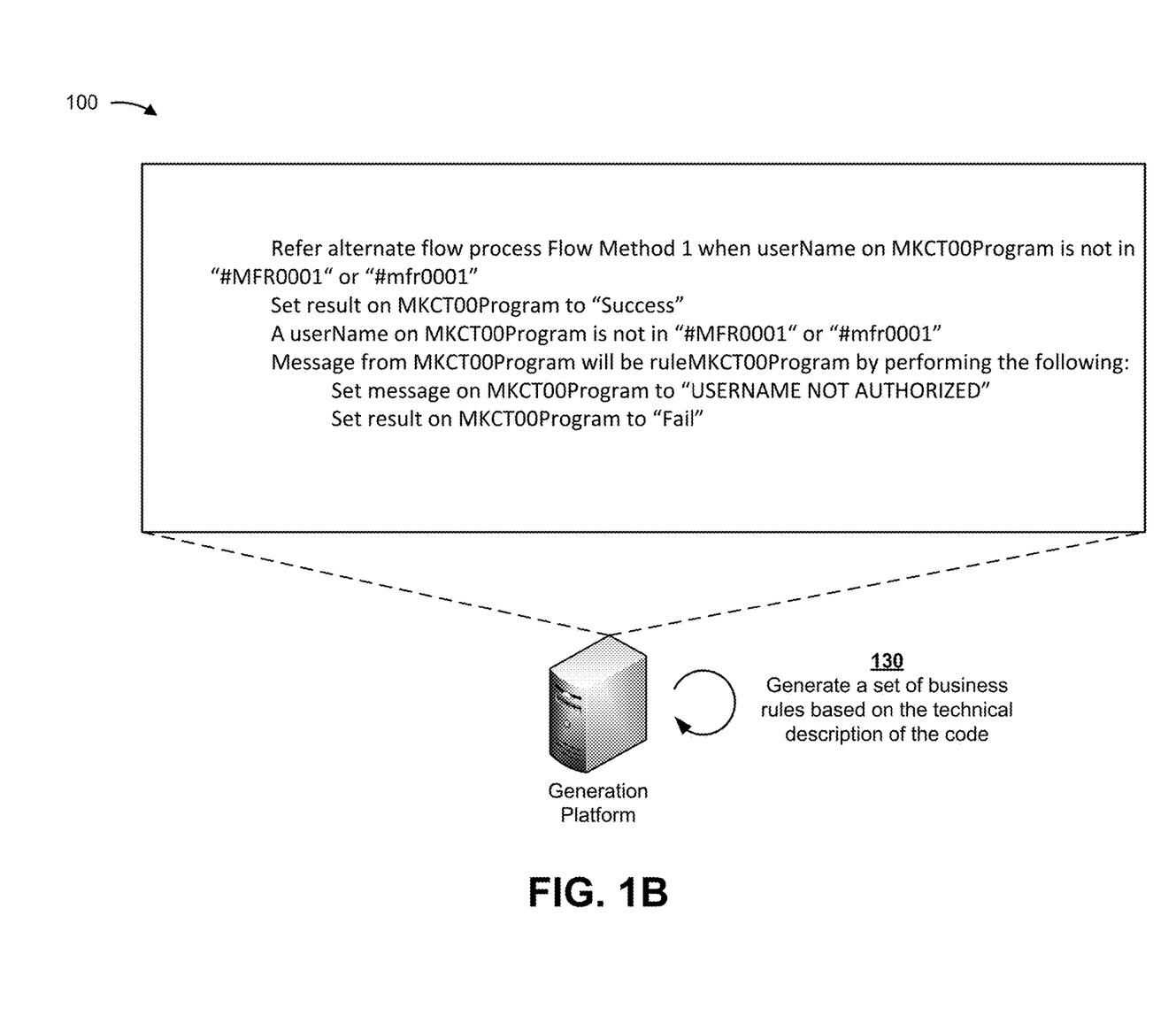
Figure 1C:
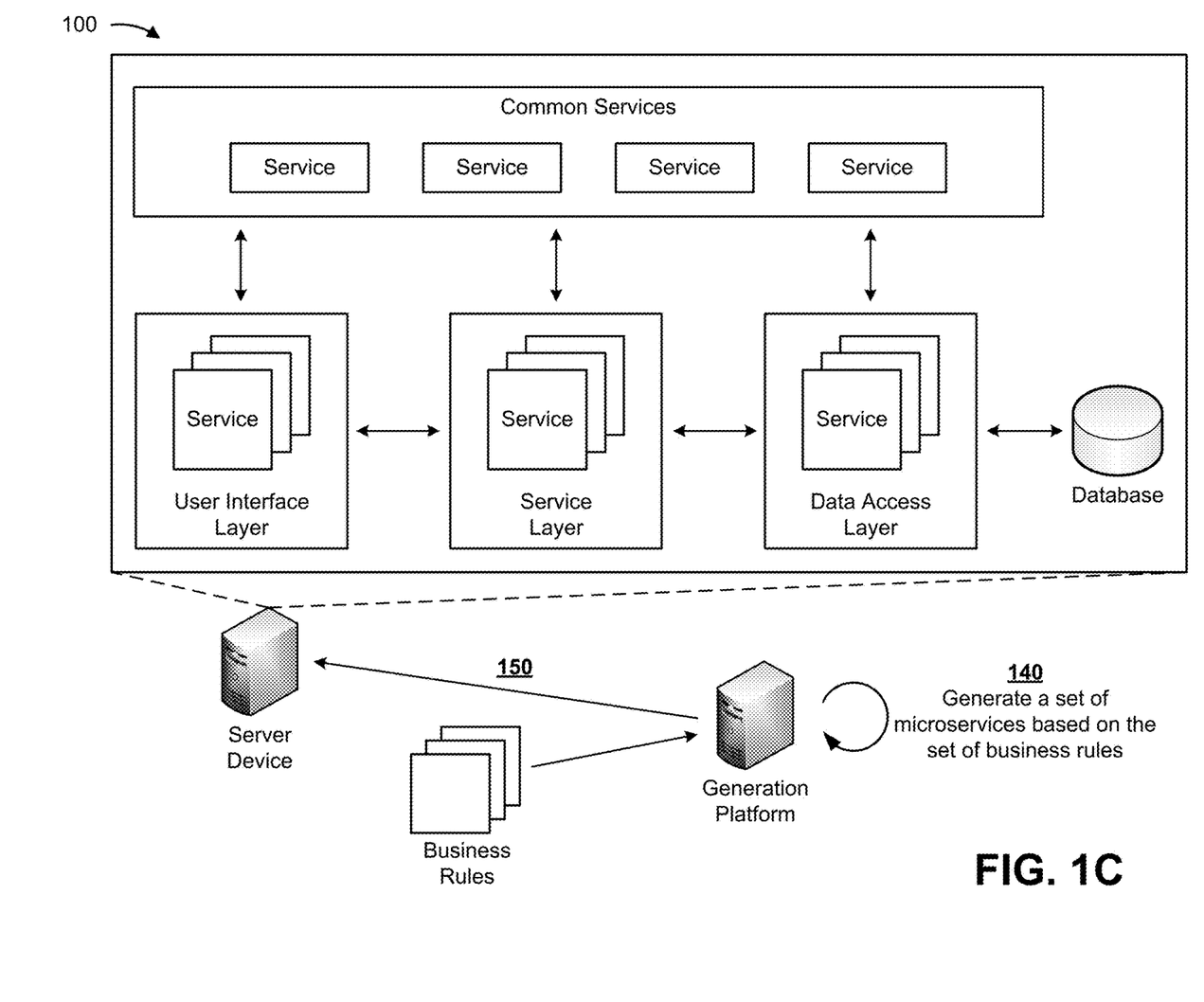

FIGS. 1A-1C are diagrams of an overview of an example implementation 100 described herein. As shown in FIG. 1A, example implementation 100 may include a server device and a generation platform (e.g., a cloud server). As shown by reference number 110, the generation platform may receive, from the server device, information that identifies code associated with an application.

In some implementations, the application may include a monolithic application (e.g., a single-tiered software application in which user interface code and data access code are combined into a single program). In some implementations, the application may be written in the COBOL programming language. As described herein, the generation platform may convert the monolithic application into a set of microservices to enable modularity of the application, to modernize the legacy application, to improve extensibility of the application, or the like. While some implementations herein describe the COBOL programming language, it should be understood that other implementations include and/or are applicable to other programming languages associated with legacy applications.

In some implementations, the application may be associated with a set of segments. A segment may include code that is associated with a particular function associated with the application. For example, as shown in FIG. 1A, a particular segment may be associated with the functionality of displaying, via a user interface, information associated with a log-in process:

```
CHECK USERNAME
    IF USRNMEI NOT = '#MFR0001' AND
    USRNMEI NOT = '#mfr0001'
    MOVE 'USERNAME NOT AUTHORIZED' TO
        LGMSGMO
    EXEC CICS SEND
        MAP('MKCTLOG')
    MAPSET('MKCTSET')
        CURSOR FRSET FREEKB
        END-EXEC
```

While a particular segment is shown, it should be understood that the application includes thousands, millions, etc. of segments.

As further shown in FIG. 1A, and by reference number 120, the generation platform may generate a technical description of the code based on the information that identifies the code associated with the application. As a particular example, the generation platform may generate, based on the segment, the following technical description:

When the user name field of the MKCTLOG screen not is equal to "# MFR0001" and is not equal to "# mfr0001,"

Populate "USERNAME NOT AUTHORIZED" to the message field of the MKCTLOG screen,

Send the MKCTLOG screen along with the output area and Cursor reset MDT's before writing the data to screen with the option to unlock the keyboard.

As shown in FIG. 1B, and by reference number 130, the generation platform may generate a set of business rules based on the technical description of the code. In some implementations, a business rule may include a rule that defines or constrains some aspect of an entity (e.g., a business, an organization, an individual, etc.). In some implementations, the set of business rules may be associated with a semantics of business vocabulary and business rules (SBVR) format (e.g., based on a standard that defines a vocabulary and rules for documenting the semantics of business vocabularies, business facts, and business rules).

In some implementations the generation platform may identify code templates based on the business rules, and may use the code templates to generate microservices. As a particular example, the generation platform may generate, based on the technical description of the segment, the following business rule:

Refer alternate flow process Flow Method 1 when user-Name on MKCT00Program is not in "# MFR0001" or "# mfr0001"

Set result on MKCT00Program to "Success"

A userName on MKCT00Program is not in "# MFR0001" or "# mfr0001"

Message from MKCT00Program will be ruleMKCT00Program by performing the following:

Set message on MKCT00Program to "USERNAME NOT AUTHORIZED"

Set result on MKCT00Program to "Fail"

As shown in FIG. 1C, and by reference number 140, the generation platform may generate a set of microservices based on the set of business rules. In some implementations, a microservice may refer to a process that communicates with other microservices over a network in order to fulfill a goal. In some implementations, the generation platform may generate microservices based on different tiers (e.g., for a user interface layer, a service layer, and/or a data access layer, as shown). In some implementations, the generation platform may generate the set of microservices based on a set of code templates. For example, a code template may include one or more lines of first code that are used to generate second code (e.g., generic code that is used to generate unique code).

As shown by reference number 150, the generation platform may provide information associated with the set of microservices to deploy the set of microservices to a production environment (e.g., a controlled environment in which an application is available for use by an entity, such as a customer, a user, or the like). In some implementations, the generation platform may receive information associated with the application (e.g., information that identifies issues associated with the application, identifies users' feedback regarding the application, or the like). In some implementations, the generation platform may provide the information to a user device (e.g., identifying the issues, feedback, etc.).

In some implementations, the generation platform may provide a message to a user device, such as to notify a user (e.g., a subject matter expert, a programmer, a developer, a tester, etc.) of the status of a particular project, to notify a user to perform an action (e.g., modify code, verify results, etc.), or the like. In some implementations, the generation platform may automatically orchestrate additional testing, automatically perform a debugging process of the application, automatically analyze code associated with the application and suggest a particular correction, automatically identify code associated with a potential defect, or the like. Additionally, or alternatively, the generation platform may execute the set of microservices to determine whether the microservices perform a functionality of the legacy application in a consistent manner with that of the legacy application.

In this way, some implementations described herein provide a generation platform to automatically generate a set of microservices based on a legacy application. In this way, some implementations described herein reduce an amount of manual programming, reduce or eliminate subjectivity in programming, improve application modularity, reduce an amount of programming associated with future improvements of the application (e.g., by enabling the modifications to be completed in association with a particular microservice rather than a larger code base), enable modernization of legacy applications, reduce errors associated with application development, or the like.

As indicated above, FIGS. 1A-1C are provided merely as an example. Other examples are possible and may differ from what was described with regard to FIGS. 1A-1C.

Figure 2:
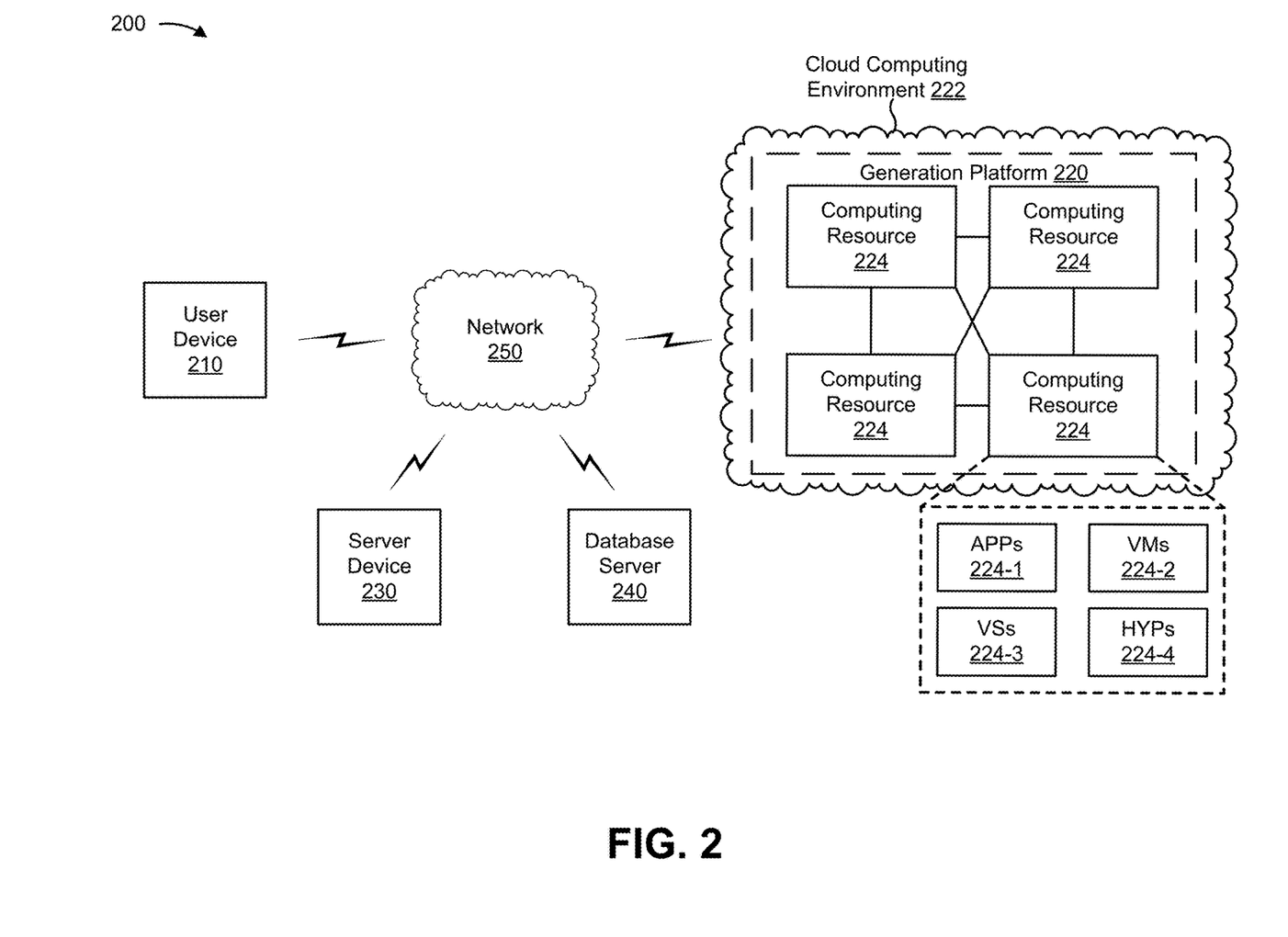
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a generation platform 220, a server device 230, a database server 240, and a network 250. Devices of environment 200 may interconnect via wired connections, wireless connections, or a combination of wired and wireless connections.

User device 210 includes one or more devices capable of receiving, generating, storing, processing, and/or providing information associated with generation platform 220. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Generation platform 220 includes one or more devices capable of automatically generating microservices based on technical descriptions of code. In some implementations, generation platform 220 may be designed to be modular such that certain software components can be swapped in or out depending on a particular need. As such, generation platform 220 may be easily and/or quickly reconfigured for different uses.

In some implementations, as shown, generation platform 220 may be hosted in cloud computing environment 222. Notably, while implementations described herein describe generation platform 220 as being hosted in cloud computing environment 222, in some implementations, generation platform 220 may not be cloud-based (i.e., may be implemented outside of a cloud computing environment) or may be partially cloud-based.

Cloud computing environment 222 includes an environment that hosts generation platform 220. Cloud computing environment 222 may provide computation, software, data access, storage, etc. services that do not require end-user (e.g., user device 210) knowledge of a physical location and configuration of system(s) and/or device(s) that hosts generation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host generation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with generation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Server device 230 includes one or more devices capable of receiving, processing, storing, generating, and/or providing information associated with an application. For example, server device 230 may include a server device (e.g., a host server, a web server, a mainframe server, an application server, etc.), a cloud computing device, or a similar device.

Database server 240 includes one or more devices capable of receiving, processing, storing, generating, and/or providing information associated with an application. For example, database server 240 may include a server device (e.g., a host server, a web server, an application server, etc.), a cloud computing device, or a similar device.

Network 250 may include one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
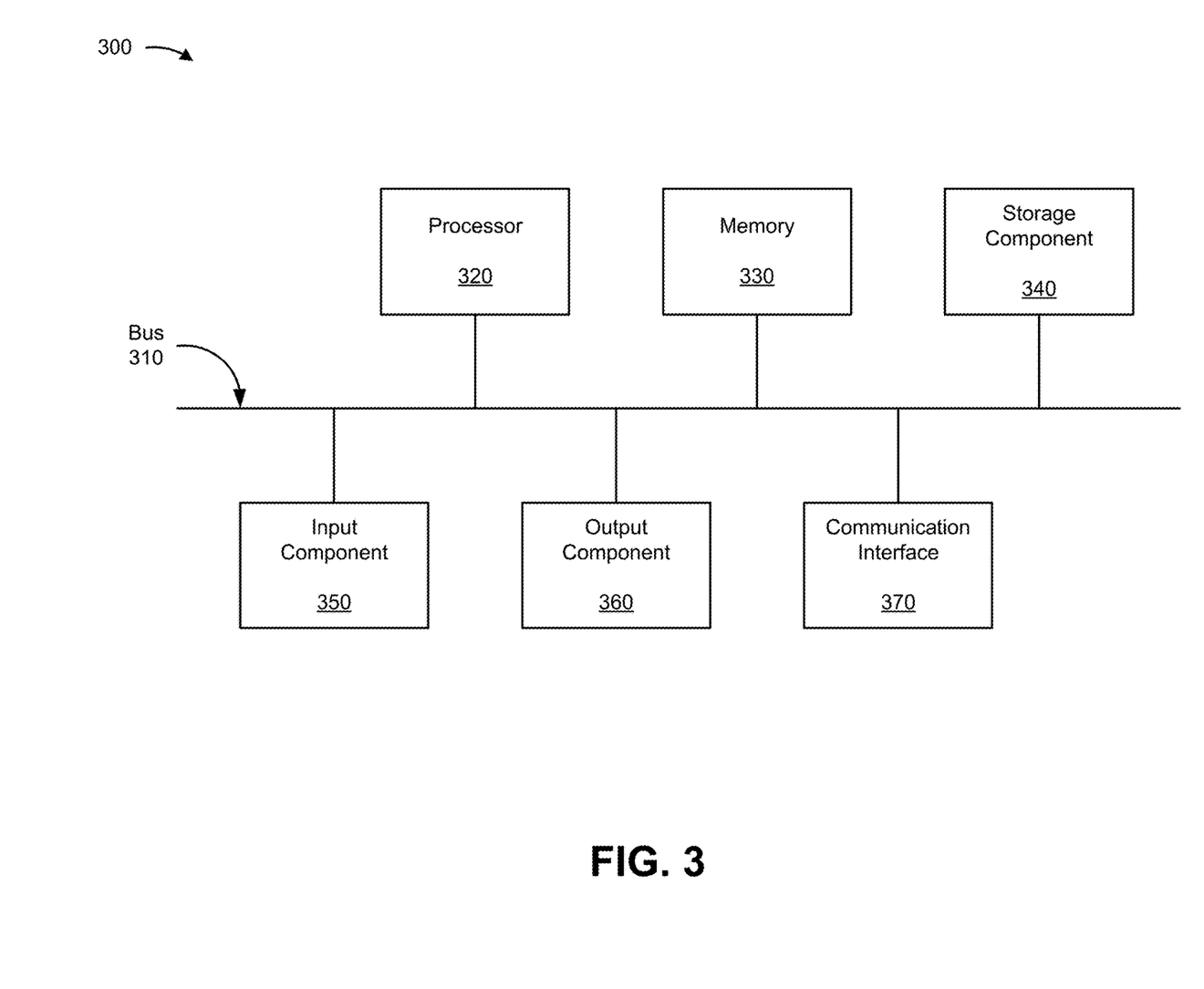
FIG. 3 is a diagram of example components of one or more devices of FIG. 2.

FIG. 3 is a diagram of example components of a device 300. Device 300 may correspond to user device 210, generation platform 220, server device 230, and/or database server 240. In some implementations, user device 210, generation platform 220, server device 230, and/or database server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
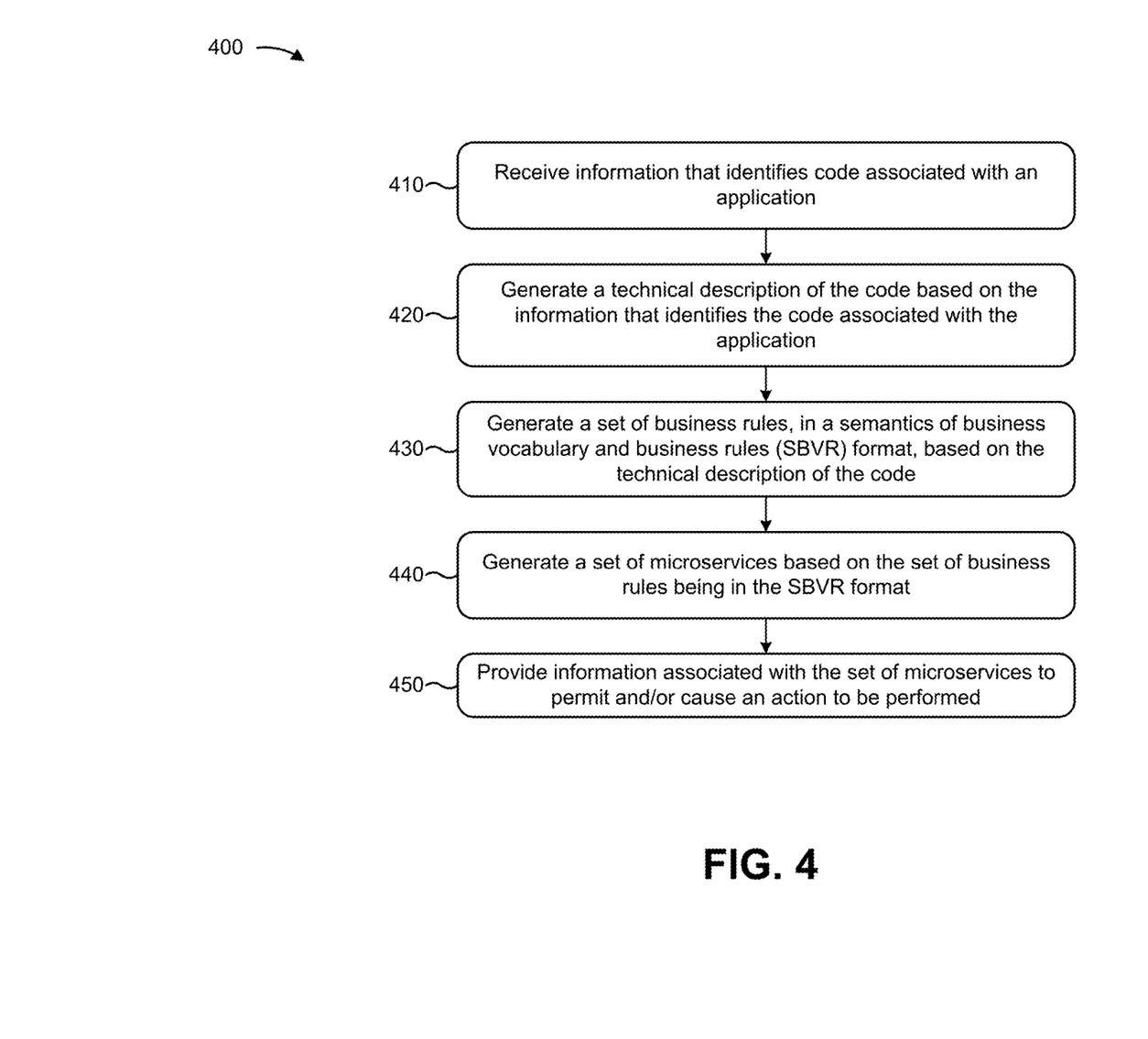
FIG. 4 is a flow chart of an example process for automatically generating a set of microservices based on technical descriptions of legacy code.

FIG. 4 is a flow chart of an example process 400 for automatically generating a set of microservices based on technical descriptions of legacy code. In some implementations, one or more process blocks of FIG. 4 may be performed by generation platform 220. In some implementations, one or more process blocks of FIG. 4 may be performed by another device or a group of devices separate from or including generation platform 220, such as user device 210, server device 230, and/or database server 240.

As shown in FIG. 4, process 400 may include receiving information that identifies code associated with an application (block 410). For example, generation platform 220 may receive information that identifies code associated with the application so that generation platform 220 may automatically generate a set of microservices that provide functionality associated with the application. In this way, generation platform 220 enables application modularity by generating a set of microservices that respectively perform particular functionality associated with an overall functionality of a monolithic legacy application.

In some implementations, generation platform 220 may receive, from user device 210, information that identifies the code associated with the application (e.g., a set of files including source code associated with the application). Additionally, or alternatively, generation platform 220 may receive, from user device 210, information that identifies a memory location at which the information that identifies the code associated with the application is stored, and may obtain the information based on the memory location.

In some implementations, the application may include a monolithic application. For example, a monolithic application may refer to a single-tiered software application in which user interface code and data access code are combined into a single program. In some implementations, the application may include a customer information control system (CICS) application. For example, a CICS application may include a set of programs that interact to perform a business operation (e.g., process a travel request, prepare a company payroll, or the like). In some implementations, each of the set of programs may be written in the COBOL programming language. Additionally, or alternatively, the application may be deployed on a set of mainframe servers. Additionally, or alternatively, the application may implement basic mapping support (BMS) which provides an application programming interface (API) between the CICS application and user devices 210. Additionally, or alternatively, the application may implement a virtual storage access method (VSAM) as an access method to manage various user data.

In this way, generation platform 220 may receive the information that identifies the code associated with the application, and may generate a technical description of the code, as described below.

As further shown in FIG. 4, process 400 may include generating a technical description of the code based on the information that identifies the code associated with the application (block 420). For example, generation platform 220 may generate a technical description of the code based on the information that identifies the code associated with the application. For example, generation platform 220 may receive input source code associated with the application, and may convert the source code to text (e.g., technical description text). In some implementations, a technical description may refer to text, natural language text, technical description text, etc.

In some implementations, generation platform 220 may segment the code that is associated with the application into a set of segments. For example, a segment may refer to code that is associated with a particular functionality associated with the application. In some implementations, generation platform 220 may segment the code based on performing a technique, such as a software mining technique, a program comprehension technique, a reverse engineering technique, a code parsing technique, or the like. In some implementations, generation platform 220 may segment the code into a thousand, million, billion, etc. segments. Additionally, or alternatively, generation platform 220 may implement one or more big data processing techniques when segmenting the code.

In some implementations, generation platform 220 may associate the set of segments and a set of tiers or layers (e.g., a set of tiers associated with an n-tier architecture where n>2). For example, generation platform 220 may associate respective segments with a first layer (e.g., a presentation layer), a second layer (e.g., a business layer), and a third layer (e.g., a data access layer) (e.g., where generation platform 220 associates the segments using a three-tier architecture). In some implementations, respective segments that are associated with a particular layer may perform functionality associated with the particular layer. As an example, segments of code that are associated with a presentation layer may provide user-interface functionality, segments of code that are associated with a business layer may provide business logic functionality, or the like.

In some implementations, generation platform 220 may generate the technical description based on segmenting the code into the set of segments. In some implementations, generation platform 220 may generate the technical description based on performing a technique, such as a natural language processing (NLP) technique, a code parsing technique, or the like, to convert the source code into technical description text. In some implementations, generation platform 220 may generate one or more text files based on converting the source code into technical description text.

In some implementations, generation platform 220 may prepare the technical description text for processing. For example, generation platform 220 may determine a manner in which the text is to be partitioned into text sections, and may partition the text into text sections. A text section may include, for example, a sentence, a line, a paragraph, a page, a document, or the like. In some implementations, generation platform 220 may standardize the text to prepare the text for processing. For example, generation platform 220 may modify characters, modify spacing, or the like. In this way, generation platform 220 may use a space delimiter to more easily parse the text.

In some implementations, generation platform 220 may associate tags with terms in the text. For example, generation platform 220 may receive information that identifies one or more tags, and may associate the tags with terms in the text based on tag association rules. In some implementations, the tag association rules may specify a manner in which the tags are to be associated with terms, based on characteristics of the terms. For example, a tag association rule may specify that a singular noun tag ("/NN") is to be associated with terms that are singular nouns (e.g., based on a language database or a context analysis). As an example, generation platform 220 may receive a list of part-of-speech tags (POS tags) and tag association rules for tagging terms in the text with the POS tags based on the part-of-speech of the term.

Example POS tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), PRP (personal pronoun), PRP$ (possessive pronoun), TO (to), WDT (wh-determiner), WP (wh-pronoun), WP$ (possessive wh-pronoun), WRB (wh-adverb), or the like.

In some implementations, generation platform 220 may generate a term corpus of terms and corresponding POS tags associated with the terms. In this way, generation platform 220 may generate a set of business rules, in a semantics of business vocabulary and business rules format, based on the technical description of the code, as described below.

As further shown in FIG. 4, process 400 may include generating a set of business rules, in a semantics of business vocabulary and business rules (SBVR) format, based on the technical description of the code (block 430). For example, generation platform 220 may generate a set of business rules, in an SBVR format, based on the technical description of the code.

In some implementations, a business rule may include a rule that defines or constrains some aspect of an entity (e.g., a business, an organization, a person, or the like). For example, a business rule may include a rule that describes operations, definitions, and/or constraints associated with an entity.

In some implementations, the set of business rules may be associated with an SBVR format. In some implementations, the SBVR format defines a vocabulary and rules for documenting the semantics of business vocabularies, business facts, and business rules. Additionally, or alternatively, the SBVR format may define a data model (e.g., an Extensible Markup Language (XML) schema, an XML Metadata Interchange (XMI) schema, etc.) for the interchange of business vocabularies and business rules among entities and between software tools.

In other implementations, the set of business rules may be associated with another rule format, such as a business process definition metamodel (BPDM), an organization structure metamodel (OSM), a business motivation model (BMM), a web ontology language (OWL) model, a resource description framework schema (RDFS), a unified modelling language (UML) model, an entity relationship (ER) model, or the like.

In some implementations, generation platform 220 may generate the set of business rules, in the SBVR format, based on performing a technique, such as a syntactic analysis technique, a semantic analysis technique, an NLP technique, a machine learning technique, or the like.

In some implementations, generation platform 220 may generate the set of business rules based on mapping terms and business rule elements. For example, a business rule may be associated with a set of constituent elements. As a particular example, the SBVR standard may define particular business rule elements, such as fact types, verb concepts, noun concepts, modality operators (e.g., alethic modality operators, deontic modality operators, or the like), constraints, or the like. In some implementations, generation platform 220 may store mapping information that may be utilized when mapping terms and business rule elements. In some implementations, generation platform 220 may map a term and a business rule element based on a POS tag associated with the term.

In this way, generation platform 220 may increase consistency of rule generation by representing the business rules in a particular format. Additionally, in this way, generation platform 220 may generate a set of microservices based on the set of business rules and a set of code templates, as described below.

As further shown in FIG. 4, process 400 may include generating a set of microservices based on the set of business rules being in the SBVR format (block 440). In some implementations, generation platform 220 may generate a set of microservices based on the set of business rules that are associated with the SBVR format. In some implementations, a microservice may refer to a process that communicates with other microservices over a network in order to fulfill a goal. For example, each microservice, of the set of microservices, may implement a particular functionality associated with the legacy application. In other words, the set of microservices may interact to provide substantially all of the functionality associated with the legacy application (i.e., the monolithic application).

In some implementations, generation platform 220 may generate the set of microservices based on a set of code templates. For example, a code template may include one or more lines of first code that are used to generate second code. As an example, a code template may include generic code that is used to generate unique code. In some implementations, generation platform 220 may generate the set of microservices based on code templates, such as JQuery templates, Drools templates, Java templates, hypertext markup language (HTML) templates, cascading style sheets (CSS) templates, node templates, AngularJS templates, or the like.

In some implementations, generation platform 220 may identify a code template based on a business rule or a set of business rules. For example, a particular business rule may be associated with a particular code template (e.g., a code template may include particular syntax, semantics, etc. associated with a business rule). In some implementations, generation platform 220 may identify multiple code templates, and may select a particular code template based on the business rule, based on a tier or layer associated with the segment of code that is associated with the business rule, or the like.

In some implementations, generation platform 220 may generate microservices based on different tiers or layers. For example, generation platform 220 may generate microservices for the user interface layer, the business layer, and/or the data access layer. As an example, a segment of code may be associated with a particular tier or layer (e.g., a business layer). Further, a business rule, that was generated based on the segment of code, may be associated with the particular layer. Further still, a microservice, that was generated based on the business rule, may be associated with the particular layer. That is, the microservice may provide functionality associated with the business layer.

In some implementations, generation platform 220 may generate a microservice based on a segment of code. For example, as described above in connection with block 420, generation platform 220 may identify a set of segments based on the code associated with the application. In some implementations, generation platform 220 may generate a microservice that corresponds to a particular segment (e.g., executes functionality associated with the particular segment). In some implementations, generation platform 220 may generate a microservice based on a set of segments of code. For example, the set of segments may include some common functionality. In this case, generation platform 220 may generate a microservice (e.g., a common service) that executes the common functionality based on the set of segments of code.

In some implementations, generation platform 220 may generate the microservices such that the microservices may communicate via application programming interfaces (APIs) (e.g., RESTful APIs, DAO APIs, or the like), via messaging queues, or the like. In this way, generation platform 220 may generate the microservices (e.g., generate code associated with the microservices) such that the microservices may communicate to execute an overall functionality of the legacy application.

As further shown in FIG. 4, process 400 may include providing information associated with the set of microservices to permit and/or cause an action to be performed (block 450). For example, generation platform 220 may provide information associated with the set of microservices.

In some implementations, generation platform 220 may provide information associated with the set of microservices to permit and/or cause the action of deployment of the set of microservices. For example, generation platform 220 may provide code associated with the set of microservices to a production environment of a particular server device 230 or a set of server devices 230. In some implementations, a production environment may include a controlled environment via which an application is available for use by an entity (e.g., a customer, a user, or the like).

Additionally, or alternatively, generation platform 220 may provide the code to another environment of server device 230 or the set of server devices 230, such as a development environment, a testing environment, a user acceptance testing environment, etc. Additionally, or alternatively, generation platform 220 may provide the code to a repository device (e.g., to database server 240 for source code management functionality, distributed revision control, or the like).

In some implementations, generation platform 220 may cause the microservices to be tested. For example, generation platform 220 may cause testing to be performed such that a functionality associated with the microservices is substantially similar to a functionality of the legacy application.

In some implementations, generation platform 220 may receive, from server device 230, information associated with the microservices based on providing the code to the production environment. For example, generation platform 220 may receive information that identifies issues associated with the set of microservices (e.g., crashes, bugs, etc.), may receive information that identifies users' feedback regarding the set of microservices, or the like. In some implementations, generation platform 220 may receive information associated with the set of microservices, and may provide information to user device 210 (e.g., identifying particular issues, particular recommendations, etc.).

In some implementations, generation platform 220 may provide information associated with the set of microservices to permit and/or cause the action of providing a message to user device 210. For example, generation platform 220 may cause a message (e.g., an email or a short message service (SMS) message) to be sent to user device 210 based on generating the set of microservices, and/or providing the code associated with the set of microservices to the production environment. In this way, generation platform 220 may notify a user (e.g., a subject matter expert, a programmer, a developer, a tester, etc.) of the status of a particular project, may notify a particular user to perform an action (e.g., modify code, verify testing results, etc.), or the like.

In some implementations, generation platform 220 may automatically orchestrate testing, automatically perform a debugging process of the set of microservices, automatically analyze code associated with the set of microservices and suggest a particular correction, automatically identify code associated with a potential defect, or the like. For example, generation platform 220 may receive, from server device 230, information associated with the set of microservices (e.g., information identifying an issue, a failure, etc.), and may automatically perform one or more of the above operations. In this way, generation platform 220 may reduce a quantity of errors associated with code and/or a set of microservices, thereby conserving processor and/or memory resources of computing devices (e.g., devices executing the application).

In this way, some implementations described herein enable improvement of application modularity, enable modernization of legacy applications, reduce an amount of manual programming, reduce errors and/or subjectivity associated with manual programming, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide automatic generation of microservices based on source code associated with a legacy application. For example, some implementations described herein may generate microservices based on business rules (e.g., business rules generated based on a technical description of the code associated with the application). In this way, implementations described herein enable application modularity, reduce the need of manual programming, improve the extensibility of existing applications, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, code is to be broadly interpreted to include text-based code that may not require further processing to execute (e.g., C++ code, COBOL code, hypertext mark-up language (HTML) code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, code may include different combinations of the above-identified classes of code (e.g., text-based code, binary code, text files, source code, machine code, etc.). Additionally, or alternatively, code may be of any type, such as a function, a script, an object, etc. As used herein, a code element may refer to a particular type of code, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information that identifies code associated with an application;
segment the code into a set of code segments;
generate a technical description of the code by processing the set of code segments using at least one of:
a natural language processing technique, or
a code parsing technique,
the technical description of the code including technical description text,
the technical description of the code including at least one of:
a first text segment produced by natural language processing of a first code segment included in the set of code segments, or a second text segment produced by code parsing performed on a second code segment included in the set of code segments;
associate terms included in the technical description text with part of speech (POS) tags,
each POS tag, of the POS tags, specifying, for a corresponding term included in the technical description text, a linguistic POS associated with the corresponding term;
generate a set of rules based on the technical description of the code and the POS tags,
the set of rules being associated with a semantics of business vocabulary and business rules (SBVR) format;
generate a set of microservices based on the set of rules,
at least one microservice, of the set of microservices, being a modular microservice capable of being used in multiple applications; and
provide information that identifies the set of microservices to cause an action associated with deployment of the set of microservices to be performed.

2. The device of claim 1, where the one or more processors are further to:
map the terms included in the technical description of the code, and a set of rule elements, based on the POS tags; and
where the one or more processors, when generating the set of rules, are to:
generate the set of rules based on the set of rule elements.

3. The device of claim 1, where the one or more processors are further to:
identify a set of code templates based on the set of rules; and
where the one or more processors, when generating the set of microservices, are to:
generate the set of microservices based on the set of code templates.

4. The device of claim 1, where the one or more processors are further to:
identify a set of common rules based on the set of rules; and
where the one or more processors, when generating the set of microservices, are to:
generate the set of microservices based on the set of common rules,
the set of common rules corresponding to a microservice of the set of microservices.

5. The device of claim 1, where the one or more processors are further to:
associate the technical description of the code and a set of tiers; and
where the one or more processors, when generating the set of rules, are to:
generate the set of rules based on the set of tiers.

6. The device of claim 1, where the application is a single-tiered software application.

7. The device of claim 1, where the one or more processors, when generating the set of rules, are to:
generate the set of rules based on performing at least one of:
a syntactic analysis technique,
a semantic analysis technique, or
a machine learning technique.

8. A method, comprising:
receiving, by a device, information that identifies code associated with an application;
segmenting, by the device, the code into a set of code segments;
generating, by the device, a technical description of the code by processing the set of code segments using at least one of:
natural language processing, or
a code parsing technique,
the technical description of the code including technical description text,
the technical description of the code including at least one of:
a first text segment produced by natural language processing of a first code segment included in the set of code segments, or
a second text segment produced by code parsing performed on a second code segment included in the set of code segments;
associating, by the device, terms included in the technical description text with part of speech (POS) tags,
each POS tag, of the POS tags, specifying, for a corresponding term included in the technical description text, a linguistic POS associated with the corresponding term;
generating, by the device, a set of rules based on the technical description of the code and the POS tags;
generating, by the device, a set of microservices based on the set of rules,
at least one microservice, of the set of microservices, being a modular microservice capable of being used in multiple applications; and
providing, by the device, information that identifies the set of microservices to permit an action associated with deployment of the set of microservices to be performed.

9. The method of claim 8,
where the set of code segments corresponds to a set of tiers; and
where generating the technical description of the code comprises:
generating the technical description of the code based on the set of code segments that correspond to the set of tiers.

10. The method of claim 8, further comprising:
converting the code into text using the code parsing technique; and
where generating the technical description of the code comprises:
generating the technical description of the code based on the text.

11. The method of claim 8, further comprising:
mapping the terms included in the technical description of the code, to a set of rule elements, based on the POS tags; and
where generating the set of rules based on the technical description of the code comprises:
generating the set of rules based on the set of rule elements.

12. The method of claim 8, further comprising:
identifying a code template based on the set of rules; and
where generating the set of microservices comprises:
generating the set of microservices based on the code template.

13. The method of claim 8, where the set of rules are associated with a semantics of business vocabulary and business rules (SBVR) format.

14. The method of claim 8, further comprising:
   identifying a subset of code segments, from the set of code segments, that are associated with a common functionality; and
   where generating the set of microservices comprises:
      generating a common microservice based on the subset of code segments that are associated with the common functionality.

15. A non-transitory computer-readable medium storing instructions, the instructions comprising:
   one or more instructions that, when executed by one or more processors, cause the one or more processors to:
      receive information that identifies code associated with an application;
      segment the code into a set of code segments;
      generate a technical description of the code by processing the set of code segments using at least one of:
         natural language processing, or
         a code parsing technique,
            the technical description of the code including technical description text,
            the technical description of the code including at least one of:
               a first text segment produced by natural language processing of a first code segment included in the set of code segments, or
               a second text segment produced by code parsing performed on a second code segment included in the set of code segments;
      associate terms included in the technical description text with part of speech (POS) tags,
         each POS tag, of the POS tags, specifying, for a corresponding term included in the technical description text, a linguistic POS associated with the corresponding term;
      generate a set of rules based on the technical description of the code and the POS tags,
         the set of rules being associated with a semantics of business vocabulary and business rules (SBVR) format;
      generate a set of microservices based on the set of rules,
         at least one microservice, of the set of microservices, being a modular microservice capable of being used in multiple applications; and
      provide information that identifies the set of microservices to permit an action associated with deployment of the set of microservices to be performed.

16. The non-transitory computer-readable medium of claim 15, where the
   set of code segments is associated with a set of tiers,
      the set of tiers including a user interface layer, a business layer, and/or a data access layer; and
   where the one or more instructions, that cause the one or more processors to generate the technical description of the code, cause the one or more processors to:
      generate the technical description of the code based on the set of code segments and the set of tiers.

17. The non-transitory computer-readable medium of claim 15, where the one or more instructions, when executed by the one or more processors, further cause the one or more processors to:
   map the terms included in the technical description of the code, and a set of rule elements, based on the POS tags; and
   where the one or more instructions, that cause the one or more processors to generate the set of rules, cause the one or more processors to:
      generate the set of rules based on the set of rule elements.

18. The non-transitory computer-readable medium of claim 15, where the application is a monolithic application that provides a functionality, and where the set of microservices provide the functionality.

19. The non-transitory computer-readable medium of claim 15, where the one or more instructions, when executed by the one or more processors, further cause the one or more processors to:
   convert the code into technical description text based on the code parsing technique; and
   where the one or more instructions, that cause the one or more processors to generate the technical description of the code, are to:
      generate the technical description of the code based on the technical description text.

20. The non-transitory computer-readable medium of claim 15, where the one or more instructions, when executed by the one or more processors, further cause the one or more processors to:
   identify a subset of code segments, from the set of code segments, that are associated with a common functionality; and
   generate a microservice, of the set of microservices, that executes the common functionality.

* * * * *